United States Patent
Farwaha et al.

(10) Patent No.: US 8,088,252 B2
(45) Date of Patent: Jan. 3, 2012

(54) SALT-SENSITIVE CATIONIC POLYMERIC BINDERS FOR NONWOVEN WEBS AND METHOD OF MAKING THE SAME

(75) Inventors: Rajeev Farwaha, Belle Mead, NJ (US); Philip Confalone, Raritan, NJ (US)

(73) Assignee: Celanese International Corporation

( * ) Notice: Subject to any disclaimer, the term of this patent is extended or adjusted under 35 U.S.C. 154(b) by 315 days.

(21) Appl. No.: 12/380,631

(22) Filed: Mar. 2, 2009

(65) Prior Publication Data

US 2009/0218059 A1  Sep. 3, 2009

Related U.S. Application Data

(60) Provisional application No. 61/067,873, filed on Mar. 3, 2008.

(51) Int. Cl.
*D21H 17/45* (2006.01)
*D21H 21/20* (2006.01)

(52) U.S. Cl. .......... 162/168.3; 162/158; 162/164.1; 162/164.6; 162/168.1; 162/168.2; 162/184; 524/879; 526/303.1; 526/311; 526/319

(58) Field of Classification Search .......... 162/158, 162/164.1, 164.6, 168.1–168.3, 184; 524/879, 524/881; 526/303.1, 311, 319, 72, 307.8
See application file for complete search history.

(56) References Cited

U.S. PATENT DOCUMENTS

| | | | |
|---|---|---|---|
| 3,227,672 A * | 1/1966 | Fertig et al. | 524/555 |
| 5,332,854 A | 7/1994 | Yokota et al. | 558/33 |
| 5,608,021 A | 3/1997 | Uchiyama et al. | 526/210 |
| 6,063,857 A | 5/2000 | Greenblatt et al. | 524/561 |
| 6,103,865 A | 8/2000 | Bae et al. | 528/373 |
| 6,429,261 B1 | 8/2002 | Lang et al. | 525/191 |
| 6,683,129 B1 | 1/2004 | Eknoian | 524/547 |
| 6,994,865 B2 * | 2/2006 | Branham et al. | 424/402 |
| 7,070,854 B2 | 7/2006 | Chang et al. | 428/311.11 |
| 7,141,519 B2 | 11/2006 | Bunyard et al. | 442/327 |
| 2003/0158072 A1 * | 8/2003 | Goodson et al. | 510/439 |
| 2005/0075445 A1 | 4/2005 | Confalone et al. | 524/543 |
| 2005/0234205 A1 * | 10/2005 | Yamaguchi et al. | 526/242 |
| 2005/0239356 A1 * | 10/2005 | Parsons et al. | 442/59 |
| 2007/0088118 A1 * | 4/2007 | Dungworth et al. | 524/555 |
| 2007/0173594 A1 | 7/2007 | Farwaha et al. | |
| 2007/0254543 A1 | 11/2007 | Bunyard et al. | 442/59 |

FOREIGN PATENT DOCUMENTS

| | | |
|---|---|---|
| EP | 0 055 801 A2 | 7/1982 |
| EP | 0 201 342 A2 | 12/1986 |
| EP | 1 364 804 A2 | 11/2003 |
| EP | 1 479 699 A1 | 11/2004 |
| WO | WO 03/048441 A1 | 6/2003 |

* cited by examiner

*Primary Examiner* — Matthew Daniels
*Assistant Examiner* — Dennis Cordray
(74) *Attorney, Agent, or Firm* — Michael W. Ferrell

(57) ABSTRACT

A solution with a salt-sensitive polymer binder for use in fibrous webs, where the binder contains a copolymer comprising repeat units derived from butyl acrylate, methyl methacrylate and amino functionalized alkyl acrylate or methacrylate or amino functionalized alkyl acrylamide or methacrylamide optionally including monomers such as vinyl acetate and/or vinyl acetate/ethylene. The binder solution is prepared by emulsion-polymerizing a copolymer and then neutralizing the copolymer with acid to make it water soluble. The binders are particularly suitable for strengthening nonwoven fibrous webs in disposable articles such as wet-wipes, personal care products, diapers, and the like and retain their salt-sensitivity with or without divalent metal scavengers.

26 Claims, No Drawings

SALT-SENSITIVE CATIONIC POLYMERIC BINDERS FOR NONWOVEN WEBS AND METHOD OF MAKING THE SAME

CLAIM FOR PRIORITY

This non-provisional application claims the benefit of the filing date of U.S. Provisional Patent Application Ser. No. 61/067,873, of the same title, filed Mar. 3, 2008. The priority of U.S. Provisional Patent Application Ser. No. 61/067,873 is hereby claimed and the disclosure thereof is incorporated into this application by reference.

TECHNICAL FIELD

The present invention relates generally to salt-sensitive cationic polymeric binders for nonwoven webs, and more particularly to water-soluble cationic polymer binder compositions containing amino functional monomers which are formed from emulsion polymers. These binders are effective in hard water with or without divalent metal scavengers.

BACKGROUND

Wet strength is a desirable attribute for many disposable paper products that are required to maintain their wet integrity for an extended period of time prior to and during their intended use. Such products include toilet tissue, diapers, personal care products, and pre-moistened articles such as baby wipes and household cleaning wipes.

Permanent wet strength, however, is often an unnecessary and undesirable characteristic in paper products. Many paper products are disposed of after brief periods of use into landfills, incinerators, etc. which is inconvenient and can pose a significant burden on the solid waste stream. It is therefore preferable in many cases to direct used paper products to municipal sewage treatment facilities or private septic systems. Unfortunately, this procedure is often not available if the product is "unflushable." Clogging of sewage and septic systems can result if the product permanently retains hydrolysis-resistant strength properties. To address this problem, efforts have been undertaken to make binders that will provide paper products with sufficient "temporary" wet integrity in the presence of saline solutions, but minimal integrity when exposed to large amounts of waste water, such that they traverse plumbing and disintegrate in sewage and/or septic systems.

Specifically, it has been attempted to produce disposable fibrous products which maintain a relatively high wet strength in the presence of solutions with elevated ion concentrations, but become more dispersible when in contact with solutions having a lower ion concentration. These ion sensitive, water dispersible polymer formulations are well known in the art. There is disclosed, for example, in U.S. Pat. No. 6,429,261 to Lang et al. a polymer formulation comprising a triggerable copolymer of acrylic acid, NaAMPS, butyl acrylate and 2-ethylhexyl acrylate as well as a non-crosslinkable co-binder emulsion polymer comprising poly(ethylene-vinyl acetate), wherein the polymer formulation is insoluble in a neutral salt solution containing at least about 1 weight % salt and wherein the triggerable copolymer is soluble in water containing up to about 200 ppm of one or more multivalent ions. The polymers in Lang et al. are typically prepared by solution polymerization.

U.S. Pat. No. 6,683,129 to Eknoian discloses salt-sensitive binders in aqueous emulsions comprising methacrylic acid and acrylate monomers such as butyl acrylate and 2-ethylhexyl acrylate. The ion sensitive binders are applied as emulsion compositions.

Both references discussed above produce anionic binders, Lang et al. '261 produce ion sensitive anionic binders by solution polymerization, whereas Ekonian produces anionic binders by emulsion polymerization. These approaches are typical in salt-sensitive binder applications. These binders are called anionic binders because the free carboxylic functional group in these binders are neutralized with bases such as sodium hydroxide, calcium carbonate or ammonia to form the corresponding carboxylate salts. However, anionic binder compositions, i.e. anionic salt triggerable polymers, exhibit certain undesirable properties. For instance, anionic salt triggerable polymers fail to disperse in water containing more than about 15 ppm $Ca^{2+}$ and/or $Mg^{2+}$. Thus, when nonwoven webs containing these polymers are placed in hard water, which typically contains more than about 15 ppm $Ca^{2+}$ and/or $Mg^{2+}$, they maintain a tensile strength greater than 30 g/in, which negatively affects the dispersibility of the web. The reason for this is attributed to the fact that the carboxy functions in these binders interact with either calcium and/or magnesium ion in the hard water thereby slowing the dispersibility.

The cationic binders on the other hand would result in instant dispersibility of the binders in any water including hard water. This is because of the fact that the cationic binders do not feature any functional groups that could interact for example with either calcium and/or magnesium ions present in hard water. Such uses of cationic binders in wet wipes are not yet known except for a few examples wherein the cationic binders are made by solution polymerization employing undesirable solvents as discussed further below.

However, cationic polymers having utility either as thickening agent or as a hair conditioning resin composition has been reported in the literature. For instance, U.S. Pat. No. 5,608,021 to Uchiyama et al. discloses a cationic polymer thickener. The cationic thickener is prepared by solution polymerizing a monomer composition comprising 15 to 85% by weight of at least one of acrylic monomer having an amino group and methacrylic monomer having an amino group, 20 to 80% by weight of vinyl monomer, 1 to 20% by weight of monomer having at least one of acryloyl group and methacryloyl group and 0.1 to 20% by weight of crosslinkable vinyl monomer.

European Patent Application No. 0 201 342 of Kubota et al. discloses hair conditioning resin compositions, which comprises a copolymer resin modified with a zwitterionizing agent. The resin is prepared by a solution polymerization of amino functionalized alkyl acrylates or methacrylates, amino functionalized alkyl acrylamides or methacrylamides, vinyl acetate-type monomers and other vinyl monomers. The polymerization is generally carried out in a hydrophilic solvent.

U.S. Pat. No. 7,070,854 to Chang et al. discloses triggerable, water dispersible cationic polymers. The cationic polymers as disclosed therein are made by solution polymerization comprising a copolymer containing quaternary ammonium groups and are employed as binder materials in the production of a nonwoven fabric.

U.S. Pat. No. 7,141,519 to Bunyard et al. discloses ion triggerable, water dispersible cationic polymers. The cationic polymers disclosed therein are made by solution polymerization and comprise either terpolymers or copolymers of quaternary ammonium group containing acrylates or methacrylates, alkyl acrylates or methacrylates and vinyl acetates, and the like. These cationic polymers have been used as binder compositions in water-dispersible personal care products, such as wet wipes.

United States Patent Application Publication No. US 2007/0254543 of Bunyard et al. discloses dispersible wet wipes comprising a nonwoven material. The nonwoven material comprises a fibrous material and a binder composition. The binder composition includes a cationic ion sensitive emulsion polymer, which is synthesized in-situ from a cationic polymer prepared from solution polymerization.

In contrast to the above procedures, emulsion polymers converted into water soluble polymers, whereby the emulsion polymer is put into solution by lowering the pH to acidic pH have not heretofore been used as salt-sensitive binders. Emulsion polymerized, acid-solubilized polymers have been employed primarily in applications such as thickeners. Thickeners are added to aqueous systems to increase the viscosity to a desired level and are frequently added to materials such as paints, polishing and cleaning compositions, pharmaceuticals, among others.

European Patent Application No. 0 055 801 of Fink et al. discloses a process for thickening aqueous systems by mixing the aqueous system with an aqueous dispersion of a synthetic polymer and adjusting to a pH value at which the synthetic polymer is at least colloidally soluble. The process involves mixing of the aqueous system with an aqueous dispersion of a synthetic polymer composed of: A) 5-100% by weight of an unsaturated radically polymerizable monomer with at least one basic nitrogen atom, B) 0-95% by weight of an unsaturated radically polymerizable comonomer which has at most limited solubility in water, C) 0-30% by weight of a water-soluble non-basic unsaturated radically polymerizable comonomer and has a molecular weight of at least 500,000 and is at least colloidally soluble at a pH of below 7.

United States Patent Application Publication No. US 2005/0075445 of Confalone et al. discloses a coating composition for fibrous substrates made up of 0.5 to 25 percent by weight of a water-insoluble emulsion polymer comprising from greater than 0.4 to 3 mole percent of one or more cationic monomer units and at least 50 mole percent of at least one vinyl ester monomer; 25 to 75 percent by weight pigment; cationic surfactant; and water.

Emulsion polymerization offers several advantages in the production of nonwoven binders. For example, emulsion polymerization is cost effective and environmentally safe, allowing for the production of a high-solids composition without the necessity of removing unwanted solvent. However, the present Applicants have observed that emulsion binders may not "trigger" as well as solution binders. "Triggering" is a critical mechanism in salt-sensitive applications whereby the polymer becomes insoluble in concentrated salt solutions, yet remains dispersible when in contact with solutions containing a lower concentration of ions. Also, the film-forming mechanism in emulsion polymers is different and less predictable than solution polymers. On the other hand, solution polymerization is disadvantaged from a processing standpoint because the solvent must be removed and the resulting compositions typically do not achieve as high of a solids content as can be produced with emulsion polymerization.

Thus, despite the contributions in salt-sensitive binders and products incorporating them, there still exists a need for high quality salt-sensitive binders which may be produced safely and efficiently.

SUMMARY OF INVENTION

It has been discovered in accordance with the present invention that binder solutions having salt-sensitive polymeric resins can be prepared by emulsion polymerizing a copolymer, including butyl acrylate, methyl methacrylate in the presence of a amino functionalized alkyl acrylate or methacrylate or amino functionalized alkyl acrylamide or methacrylamide optionally including monomers such as vinyl acetate and/or vinyl acetate/ethylene and then neutralizing the emulsion composition to produce a water soluble polymer. Especially preferred are polymers including butyl acrylate (BA), methyl methacrylate (MMA) and 3-(N,N-dimethyl amino)propyl methacrylamide (DMAPMA):

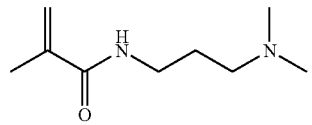

and/or 2-N,N-(dimethyl amino)ethyl methacrylate (DMAEMA):

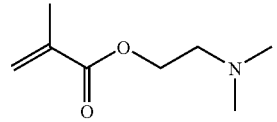

DETAILED DESCRIPTION

The present invention is described in detail below with reference to the drawing and various examples. Modifications to particular examples within the spirit and scope of the present invention, set forth in the appended claims, will be readily apparent to those of skill in the art.

Unless otherwise indicated, terms are to be construed in accordance with their ordinary meaning. Percent, for example, refers to weight %, on a dry basis, unless context indicates otherwise. Following are some exemplary definitions of terms used in this specification and the appended claims.

The phrase "an amount of emulsifier effective to maintain a stable aqueous emulsion" as the binder polymerizes, refers to an amount of emulsifying agent needed to prevent the polymer and water from separating into non-emulsified phases over at least the polymerization time. As a person of skill in the art will recognize, the effective amounts of emulsifier needed to maintain a stable aqueous emulsion will vary depending on the composition of the polymer and other factors.

"Non-woven," "non-woven web," and like terminology, refer to materials formed from loosely assembled fibers, which are bound together, in part, by a polymer binder. The binder plays an important role in the material properties, such as strength of the non-woven material.

The phrase, "binder solution", and like terminology, refers to an aqueous composition containing an emulsion polymerized binder where the polymer is neutralized with suitable pH lowering agent such as a buffer or an acid or a protonating or an alkylating agent at least to the point where the composition is no longer opaque. Aqueous polymeric emulsions (also referred to herein as "latexes"), are typically opaque, milky-white liquids. When the emulsion copolymer employed in the present invention is neutralized, for example with an acid, it begins to solubilize and the liquid becomes more transparent. For the purposes of the present invention, the emulsion copolymer is preferably neutralized to an optimum point whereby the aqueous composition becomes as clear as possible. Similarly, the phrases "water-solubilized," and "water soluble," when used in reference to an emulsion polymerized binder, mean that the polymer has been neutralized with suitable pH lowering agent such as an acid or a buffer at least to the point where it would be optically translucent as a 20 weight % aqueous composition.

"Wet tensile strength" is the tensile strength of a web when wetted. The wet tensile strength as used herein is measured according to the TAPPI UM 656 procedure and is reported in gf/in, consistent with the tests in the Examples illustrated below.

"Wet strength index" as used herein, is defined as the normalized cross-machine wet tensile strength in gf/in (adjusted for basis weight; see Examples below) of a web divided by the amount of binder add-on.

"Characteristic wet strength index" refers to the wet strength index that a binder or binder solution provides to a standard web when subjected to standard conditions, and soaked in a specified solution. For the purposes of this invention, the characteristic wet strength index is a property of the binder which is measured as set forth in the Examples below. Accordingly, the characteristic wet strength index of a binder is determined by finding the average cross-machine wet tensile strength of samples which have been cut from Whatman No. 4 filter paper, provided with an amount of binder solution equivalent to an add-on of from 10-16 percent, dried, and then soaked for 60 minutes in the prescribed solution. The resulting tensile strength is normalized to a basis weight of 112.5 gsm, which is a representative average basis weight for testing purposes. The characteristic wet strength index is then calculated by dividing the normalized wet tensile strength (in units of gf/in) by the percent of binder add-on.

"Salt-sensitive," when used in reference to a binder, refers to the characteristic of a binder to provide a higher wet strength index in concentrated salt solutions as compared to its wet strength index in deionized water. The compositions of the present invention typically exhibit a wet strength index in deionized water of less than 25 and a characteristic wet strength index in an aqueous solution of 10% NaCl that is at least 15 points higher than it exhibits in deionized water, i.e., the binder exhibits at least a 15 point index elevation in solutions with 10% salt. In preferred embodiments, the binder exhibits a wet strength index elevation in an aqueous solution of 10% NaCl of at least 20 points, 35 points or, even more preferably at least 50 points. Thus, the binders employed in the present invention are dispersible in deionized water and non-dispersible in solutions containing high ion concentrations. Although 10% NaCl solutions are used as a reference for concentrated salt solutions, it should be understood that the binders of the present invention will typically be non-dispersible in aqueous solutions having a salt content of at least about 0.5 wt. percent or, perhaps, even lower. The fibrous webs exhibit similar salt-sensitive dispersibility behavior when provided with the binder. The dispersibility of a web is inversely proportional to the wet tensile strength, i.e., high wet strengths correspond to a low dispersibility.

In one aspect of this invention there is provided a method for producing a salt-sensitive polymeric binder solution for a nonwoven article. The method comprises following steps:
  i) preparing an emulsion composition by emulsion-polymerizing in an aqueous medium a copolymer resin containing from about 5 to about 50 wt. percent of amino group containing repeat units derived from amino functionalized monomers and from about 50 to about 95 wt. percent of comonomer repeat units derived from other ethylenically unsaturated monomers such as vinyl acetate and optionally ethylene acrylates, acrylamides and so forth;
  ii) converting the emulsion composition into a solution by neutralizing the copolymer resin with an acid until the resin is water soluble; and
  iii) controlling the viscosity of the solution to be less than about 2,000 cps at 23° C. Preferably the viscosity of the solution is controlled to be less than about 1,000 cps at 23° C.

In a further embodiment, the method of this invention comprises an additional step of diluting the emulsion composition to a solids level of from about 10 to about 35 wt. percent prior to neutralizing the copolymer resin. The preparation of emulsion composition and levels of desirable solids content are further described in detail below.

Broadly, amino group containing repeat units include without any limitation, N,N-dialkylaminoalkyl acrylate, N,N-dialkylaminoalkyl methacrylate, N,N-dialkylaminoalkyl acrylamide, N,N-dialkylaminoalkyl methacrylamide, where the alkyl groups are independently $C_1$-$C_{18}$. Specific examples of amino group containing repeat units without any limitation include the following: 2-(N,N-dimethylamino)ethyl acrylate, 2-(N,N-diethylamino)ethyl methacrylate, 2-(N,N-dimethylamino)ethyl methacrylamide, 3-(N,N-dimethylamino)-2,2-dimethylpropyl acrylate, 2-(N,N-diethylamino)ethyl acrylate, 2-(tertiary-butylamino)ethyl methacrylate, 3-(N,N-dimethylamino)propyl methacrylamide, vinylpyridine and allylamine. It should be noted that any combination of mixtures of these monomers can be employed in the preparation of the copolymer resin of this invention. Furthermore, monomers such as vinyl formamide, vinylacetamide, etc. which generate amine moieties on hydrolysis may also be used. 2-(N,N-dimethyl-amino)ethylmethacrylate (DMAEMA) and/or 3-(N,N-dimethylamino)-propyl methacrylamide (DMAPMA) are preferred as noted above.

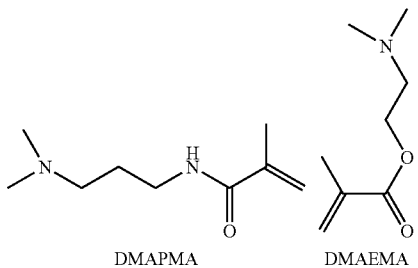

DMAPMA          DMAEMA

Various known ethylenically unsaturated monomers including vinyl acetate, acrylate and methacrylate monomers without any limitation can be employed in this invention. Broadly, suitable monomers include without any limitation, alkyl acrylate, hydroxyalkyl acrylate, alkyl methacrylate, hydroxyalkyl methacrylate, alkyl acrylamide and alkyl methacrylamide, wherein alkyl is $C_1$-$C_{18}$, preferably wherein alkyl is $C_1$-$C_8$ and more preferably wherein alkyl is $C_1$-$C_4$. Other suitable monomers may comprise maleates, itaconates, vinyl esters, styrenics, acrylonitrile, nitrogen functional monomers, alcohol functional monomers, and unsaturated hydrocarbons. In some embodiments, the ethylenically unsaturated monomer units also comprise hydrophobic monomers and/or hardening monomers, as is discussed in detail below.

Specific ethylenically unsaturated monomers that are suitable include without any limitation, methyl acrylate, ethyl acrylate, butyl acrylate, methyl methacrylate, ethyl methacrylate, butyl methacrylate, 2-hydroxyethyl acrylate, 2-hydroxybutyl acrylate, tertiary butyl acrylamide, N-tertiary octyl acrylamide, isopropyl acrylamide, and N-(1,1,-dimethyl-3-oxobutyl)acrylamide, and the like. Particularly preferred are n-butyl acrylate and methyl methacrylate or a mixture of both. The copolymer generally comprises from about 50 to 95 wt. percent of alkyl acrylate and/or alkyl methacrylate monomers. In some embodiments, the copolymer consists essentially of alkyl acrylate monomers and amino functionalized monomers, such that other components are not present in amounts that affect the basic and novel characteristics of the inventive binders—namely their salt-sensitivity. Also, while it is recognized that butyl acrylate and like lower alkyl acrylates may be somewhat hydrophobic, they are not considered a "hydrophobic monomer" for the purposes of this invention.

As noted above, the ethylenically unsaturated monomers may optionally comprise hydrophobic monomers in amounts such that the salt-sensitive copolymer includes from 2 to 20 wt. percent of hydrophobic monomer units. The presence of a hydrophobic monomer may improve the triggering properties of the binder, particularly in applications where hard water dispersibility is desired. The hydrophobic monomer is optionally selected from alkyl(meth)acrylamides having from 2 to 15 carbon atoms in the alkyl moiety, straight chained or branched alkyl methacrylates having from 4 to 12 carbon atoms in the alkyl moiety, straight chained or branched alkyl acrylates having from 5 to 12 carbon atoms in the alkyl moiety, a substituted or unsubstituted cycloalkyl (meth)acrylate, and combinations thereof.

The optional alkyl(meth)acrylamide component includes alkyl and carbonyl alkyl (meth)acrylamides having from 2 to 15 carbon atoms in the alkyl moiety, and preferably from 4-12, or 6-10 carbon atoms in the alkyl moiety. Exemplary monomers include those such as tertiary butyl acrylamide, N-tertiary octyl acrylamide, isopropyl acrylamide, and N-(1,1,-dimethyl-3-oxobutyl)acrylamide. A preferred alkyl acrylamide is N-tertiary octyl acrylamide (8 carbon atoms in the alkyl moiety) which may be represented by the following structures.

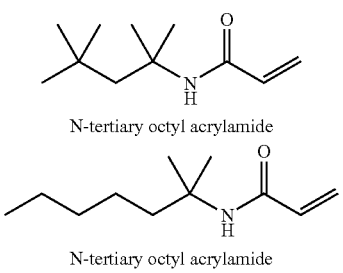

N-tertiary octyl acrylamide

N-tertiary octyl acrylamide

The hydrophobic monomer units may further comprise an alkyl methacrylate which should generally have from 4 to 12 carbon atoms in the alkyl moiety, preferably from 4 to 6 carbon atoms in the alkyl moiety. Suitable alkyl methacrylate monomers include n-butyl methacrylate.

The hydrophobic monomer units may also include straight chained or branched alkyl acrylates which have from 5 to 12 carbon atoms in the alkyl moiety. Exemplary alkyl acrylates of this type include hexyl acrylate and 2-ethylhexyl acrylate (2EHA). However, while hydrophobic alkyl methacrylate or alkyl acrylate monomers may be suitable in many embodiments, the salt-sensitive copolymer used in the invention preferably has less than 5 wt. percent of straight or branched chain alkyl(meth)acrylates that have from 8 to 12 carbon atoms in the alkyl moiety, e.g. 2-ethylhexyl acrylate. Indeed, typically the copolymer is substantially free of hydrophobic monomers such as 2-ethylhexyl acrylate.

If the hydrophobic monomer units comprise a cycloalkyl (meth)acrylate, (including bi-cycloalkyl(meth)acrylates), it should contain from 4 to 20 carbon atoms in the cycloalkyl moiety. Suitable cycloalkyl(meth)acrylate monomers include isobornyl acrylate, isobornyl methacrylate, cyclohexyl(meth) acrylate, 3,5,5-trimethylcyclohexyl(meth)acrylate, 4-tert-butylcyclohexyl(meth)acrylate, and mixtures thereof. Preferably, the monomer is a bi-cycloalkyl(meth)acrylate with from 6 to 12 carbon atoms in the cycloalkyl moiety; isobornyl methacrylate which has the following structure, is especially preferred:

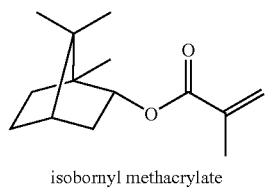

isobornyl methacrylate

The ethylenically unsaturated monomers used in the salt-sensitive copolymer may also include hardening monomers in amounts such that the copolymer includes from 2 to 55 wt. percent of hardening monomer units. More preferably, the hardening monomer units are present in the ranges of from 10 to 50 wt. percent, or from 15 to 45 wt. percent. As used herein, "hardening monomers" refers to monomers having a glass transition temperature (based on a homopolymer of that monomer) of at least −40° C. Preferably the hardening monomer has a glass transition temperature of greater than 0° C., and suitably in the ranges of 40° C.-140° C. or 80° C.-120° C. It should be understood, of course, that many monomers used in the invention may be characterized as both a hardening monomer and a hydrophobic monomer. Most preferably, the hardening monomer comprises methyl methacrylate which has a glass transition temperature of about 105° C. It is believed that the addition of monomers which raise the glass transition temperature of the salt-sensitive polymer may also favorably affect the triggering properties of the binder.

Monomers with substantial irreversible cross-linking characteristics should generally not be used with the polymers of the present invention because a significant amount of cross-linking will adversely affect the dispersibility of the copolymer in water. The copolymer should generally contain less than about 1.0 wt. percent, suitably less than 0.25 wt. percent of pre-crosslinkable monomers. Desirably, the copolymer should also contain less than 0.25 wt. percent of post-crosslinkable monomers, and preferably should contain no post-crosslinkable monomers. Pre-crosslinkable monomers crosslink with themselves during the polymerization to build polymer molecular weight, and would include monomers containing at least two vinyl end groups such as divinyl benzene, among others. Post-crosslinkable monomers crosslink with themselves after the polymer has been formed. Post-crosslinkable monomers generally require a catalytic or thermal inducement to crosslink, and can often times also crosslink with cellulosic substrates. Examples of post-crosslinkable monomers include methylol containing monomers such as methylol acrylamide. In most embodiments, the copolymer employed in the present invention contains less than 0.1%, and preferably no monomers which exhibit significant cross-linking ability.

The copolymers employed in the present invention are produced by emulsion polymerization. A general method for emulsion polymerization is disclosed in United States Patent Application Publication No. US 2003/0164476 to Guo et al. The emulsion polymerization is typically carried out in an aqueous medium at a pH of lower than about 9.0, preferably at about 8.0 and at temperatures of less than 100° C., and preferably in the range of 40° C. to 80° C. Typically, a seeded or unseeded process is utilized to copolymerize the monomers in water with a surfactant. The polymerization occurs once the monomer and the initiator are added to the charge. The polymerization may be carried out batchwise, semibatch, stepwise or continuously with batch and/or continuous addition of the monomer in the conventional manner.

Suitably, at least one emulsifier is present in the polymerization. The emulsifier is present in an amount that is effective to maintain a stable aqueous emulsion of the copolymer as it polymerizes. Emulsifying agents may include surfactants and/or protective colloids. Emulsifiers perform many functions in emulsion systems including solubilizing hydrophobic monomers, determining the size of the latex particles (typically, more emulsifier results in smaller latex particles), lessening the latex sensitivity to electrolytes and providing stability to the emulsion both during and after polymerization. The amount of emulsifying agent is typically about 0.05 wt. percent to about 10 wt. percent, preferably from 0.1 to 5 percent based on the total solids weight. For salt-sensitive binders, the emulsifier should generally be present in low enough amounts such that the salt-sensitive properties of the binder are not materially affected by the emulsifying agent; it is known, for example, that excess surfactant can impede the triggering mechanism of the resin.

The emulsifiers used in the invention are preferably either anionic, non-ionic, or cationic surfactants. Suitable anionic surfactants include fatty acid soaps, sulfonated fatty acids, alkyl carboxylates, alkyl sulfates, alkyl sulfonates, alkali metal alkyl aryl sulfonates, alkali metal alkyl sulfates, sulfonated alkyl esters, alkylaryl disulfonates, sulfates of hydroxylalkanols, sulfates and phosphates of polyethoxylated alkanols and alkylphenols, as well as esters of sulfosuccinic acid; specific examples include sodium dodecylbenzene sulfonate, sodium disecondary-butylnaphthalne sulfonate, sodium lauryl sulfate, disodium dodecyldiphenyl ether disulfonate, disodium n-octadecylsulfosuccinate, sodium dioctyl sulfosuccinate, among others. Non-ionic surfactants include the addition products of 5 to 50 moles of ethylene oxide adducted to straight-chained and branch-chained alkanols with 6 to 22 carbon atoms, or alkylphenols, of higher fatty acids, or higher fatty acid amides, or primary and secondary higher alkyl amines; as well as block copolymers of propylene oxide with ethylene oxide and mixtures thereof. Poly(vinyl alcohol) may also be used as a nonionic stabilizer. Cationic surfactants may include alkyl quaternary ammonium salts and alkyl quaternary phosphonium salts, such as: alkyl trimethyl ammonium chloride, dieicosyldimethyl ammonium chloride, didocosyldimethyl ammonium chloride, dioctadecyidimethyl ammonium chloride; dioctadecyidimethyl ammonium methosulphate, ditetradecyldimethyl ammonium chloride, and naturally occurring mixtures of above fatty groups, e.g., di(hydrogenated tallow)dimethyl ammonium chloride; di(hydrogenated tallow)dimethyl ammonium methosulfate, ditallow dimethyl ammonium chloride, and dioleyldimethyl ammonium chloride. Cationically modified polyvinyl alcohol and cationically modified starch may also be used as emulsifying agents. Preferably, the surfactants used in the present invention are primarily cationic or non-ionic surfactants. Preferred surfactants are Disponil 3065 or Ammonyx Cetyl.

The emulsifying agent may be a surfactant monomer that is polymerized into the polymer backbone. Using a polymerizable surfactant is advantageous because when the emulsifying agent is polymerized into the backbone, there is essentially no free surfactant in the water phase of the emulsion; this is desirable because the presence of free surfactants may negatively affect the triggering mechanism of the inventive binder.

The polymerizable surfactant monomers are typically compositions having both hydrophilic and hydrophobic functional groups, and a polymerizable group. Polymerizable groups include allyl, acryl, methallyl or methacryl groups. Suitable polymerizable surfactant monomers may include anionic surfactants such as sulphates, phosphates, sulphosuccinate half esters, and sulphosuccinate diesters bearing copolymerizable reactive groups and nonionic surfactant monomers such as nonylphenoxy propenyl polyethoxylated alcohols. Additionally, ammonium or metal salts of unsaturated $C_6$ to $C_{30}$ organic acids may be suitable; these may be used alone or in combination with the above surfactants. Suitable polymerizable surfactants are described in U.S. Pat. No. 5,332,854 to Yokota et al., and European Patent No. 1 479 699, the entireties of which are incorporated herein by reference. Preferred polymerizable surfactants include Hitenol BC 1025 (Montello Incorporated), Trem LF-40 (a sodium dodecyl allyl sulfosuccinate surfactant available from the Henkel Corporation), and Adeka Reasoap Series Surfactants such as SR-10 (Asahi Denka Co., Ltd.). It is believed Hitenol BC and SR-10 have the following respective structures:

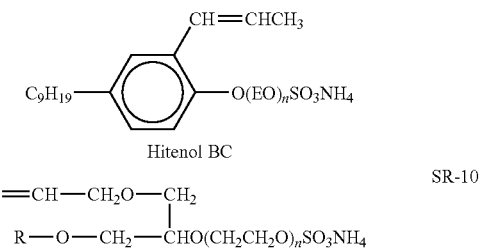

Hitenol BC

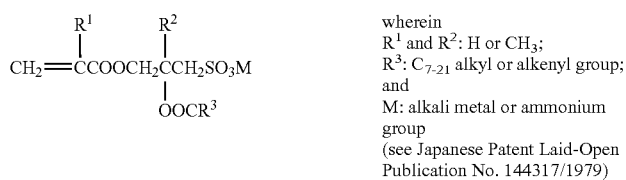

SR-10

The general structures of exemplary polymerizable surfactants are illustrated in Table 1, below:

TABLE 1

Polymerizable Surfactants

| Structure | Description |
|---|---|
| $CH_2{=}CCOOCH_2CCH_2SO_3M$ with $R^1$, $R^2$, $OOCR^3$ substituents | wherein $R^1$ and $R^2$: H or $CH_3$; $R^3$: $C_{7-21}$ alkyl or alkenyl group; and M: alkali metal or ammonium group (see Japanese Patent Laid-Open Publication No. 144317/1979) |

TABLE 1-continued

Polymerizable Surfactants

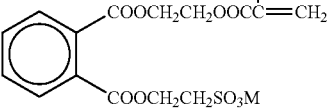

wherein
R: H or $CH_3$; and
M: alkali metal, ammonium group, or amine
(see Japanese Patent Laid-Open Publication No. 115419/1980)

wherein
R: H or $CH_3$;
A: alkylene group;
n: integer of 2 or more; and
M: monovalent or divalent cation
(see Japanese Patent Laid-Open Publication No. 34947/1987)

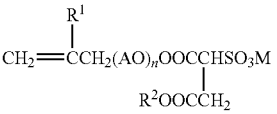

wherein
$R^1$: H or $CH_3$;
$R^2$: unsubstituted or substituted hydrocarbon group or the like;
A: $C_{2-4}$ alkylene group or substituted alkylene group; and
n: 0 or positive number
(see Japanese Patent Publication No. 46291/1974)

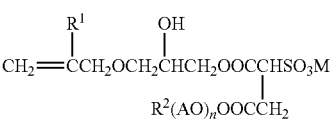

wherein
$R^1$: H or $CH_3$;
$R^2$: unsubstituted or substituted hydrocarbon group, amino group or the like;
A: $C_{2-4}$ alkylene group;
n: 0 to 100; and
M: monovalent or divalent cation
(see Japanese Patent Laid-Open Publication No. 203960/1983)

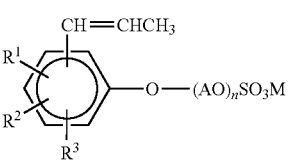

wherein
$R^1$: $C_{6-18}$ alkyl group or the like;
$R^2$: H, $C_{6-18}$ alkyl group or the like;
$R^3$: H or propenyl group;
A: $C_{2-4}$ alkytene group or substituted alkylene group;
M: alkali metal or the like; and
n: 1 to 200
(see Japanese Patent Laid-Open Publication No. 53802/1992)

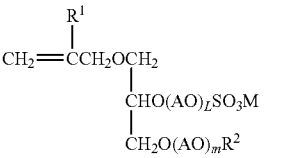

wherein
$R^1$: H or $CH_3$;
$R^2$: $C_{6-24}$ hydrocarbon group or the like;
A: $C_{2-4}$ alkylene group;
M: H, alkali metal, alkaline earth metals ammonium group or the like;
L: 0 to 20; and
m: 0 to 50
(see Japanese Patent Laid-Open Publication No. 104802/1987)

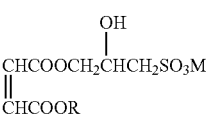

wherein
R: $C_{8-22}$ hydrocarbon group; and
M: alkali metal or ammonium group
(see Japanese Patent Laid-Open Publication No. 40366/1974)

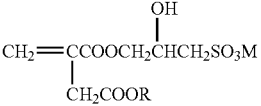

wherein
R: $C_{8-22}$ hydrocarbon group; and
M: alkali metal or ammonium group
(see Japanese Patent Laid-Open Publication No. 40366/1974)

TABLE 1-continued

| Polymerizable Surfactants | |
|---|---|
| $\begin{array}{l}\text{CHCOO(AO)}_m\text{R} \\ \| \\ \text{CHCOOM}\end{array}$ | wherein<br>R: alkyl or alkylphenyl;<br>A: ethylene;<br>M: ammonium, amine, or alkali metal; and<br>m: 9, 12, 14, or 28 (working example)<br>(see Japanese Patent Laid-Open Publication No. 134658/1977) |
| $\begin{array}{l}\quad\quad R^1 \\ \quad\quad \| \\ \text{CH}_2\!\!=\!\!\text{CCO(OCH}_2\text{CH}_2)_n\text{OR}^2\end{array}$ | wherein<br>$R^1$: H or $CH_3$;<br>$R^2$: H, $CH_3$, or $-C_6H_4-(CH_2)_m-H$; and<br>n: 4 to 30<br>(see Japanese Patent Laid-Open Publication No. 126093/1978) |
| $\begin{array}{l}\quad\quad R^1 \quad\quad\quad\quad CH_3 \\ \quad\quad \| \quad\quad\quad\quad\quad \| \\ \text{CH}_2\!\!=\!\!\text{CCOO(C}_2\text{H}_4\text{O})_x(\text{CHCH}_2\text{O})_y(\text{C}_2\text{H}_4\text{O})_z\text{R}^2\end{array}$ | wherein<br>$R^1$ and $R^2$: H or $CH_3$;<br>x: 0 to 100;<br>y: 0 to 100,<br>z: 0 to 100; and<br>$1 \leq x+y+z \leq 100$<br>(see Japanese Patent Laid-Open Publication No. 28208/1981) |
| 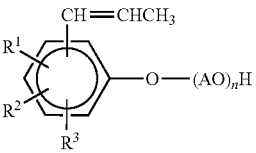 | wherein<br>$R^1$: $C_{6-18}$ alkyl group or the like;<br>$R^2$: H, $C_{6-18}$ alkyl group or the like;<br>$R^3$: H or propenyl group;<br>A: $C_{2-4}$ alkylene group or substituted alkylene group; and<br>n: 1 to 200<br>(see Japanese Patent Laid-Open Publication No. 50204/1992) |
| $\begin{array}{l}\quad\quad R^1 \\ \quad\quad \| \\ \text{CH}_2\!\!=\!\!\text{CCH}_2\text{OCH}_2 \\ \quad\quad\quad\quad\quad\quad | \\ \quad\quad\quad\quad\quad\quad \text{CHO(AO)}_L\text{H} \\ \quad\quad\quad\quad\quad\quad | \\ \quad\quad\quad\quad\quad\quad \text{CH}_2\text{O(AO)}_m\text{R}^2\end{array}$ | wherein<br>$R^1$: H or $CH_3$;<br>$R^2$: $C_{8-24}$ hydrocarbon group or acyl group;<br>A: $C_{2-4}$ alkylene group;<br>L: 0 to 100; and<br>m: 0 to 50<br>(see Japanese Patent Laid-Open Publication No. 104802/1987) |
| $\begin{array}{l}\text{CH}_2\!\!=\!\!\text{CCOO(A}^1\text{O})_m\text{R}^1 \\ \quad\quad \| \\ \quad (\text{CH}_2)_L\text{COO(A}^2\text{O})_n\text{R}^2\end{array}$ | wherein<br>$R^1$ and $R^2$: H, $C_{1-20}$ hydrocarbon group, or acyl group;<br>$A^1$ and $A^2$: $C_{2-4}$ alkylene group or substituted alkylene group;<br>L: 1 or 2;<br>m and n: 0 or positive number with the proviso that $m + n \geq 3$; and when both $R^1$ and $R^2$ are H, m and $n \geq 1$<br>(see Japanese Patent Laid-Open Publication No. 98484/1975) |

Surfactants have a tendency to lower the surface tension in water, which normally has a surface tension of about 73 dyne/cm. Typically, the surfactants used in the present invention reduce the surface tension of water by at least 30 percent when measured at 10% solids in water. Preferably, the surfactants reduce the surface tension of the water by at least 40, or even 50 percent when measured in 10% aqueous solutions. The surface tensions of water and 10% aqueous solutions of sodium AMPS, Hitenol BC 1025 and Hitenol BC 05 are listed in Table 2, below.

TABLE 2

| | Surface Tension Activity |
|---|---|
| Solution | Surface Tension at 10% solids (dyne/cm) |
| Water | 73 |
| 10% Sodium AMPS | 59 |
| 10% Hitenol BC 1025 | 36 |
| 10% Hitenol BC 05 | 29.6 |

As can be seen from Table 2, NaAMPS reduced the surface tension in water by only about 14%; thus, AMPS compounds are preferably not used as the primary emulsifying agent.

Protective colloids may also be used as a stabilizing agent. Examples of suitable protective colloids are polyvinyl alcohols, starch and cellulose derivatives, and vinylpyrrolidone copolymers. Protective colloids may also be used in conjunction with other emulsifying agents.

Initiators are typically added to the aqueous medium to stimulate polymerization. The initiators are commonly water-soluble and may decompose by high temperature or through redox reactions. The Guo reference noted above describes suitable thermal initiators and suitable redox initiator systems. Exemplary initiators include peroxygen compounds such as ammonium persulfate, potassium persulfate, sodium persulfate; peroxides such as hydrogen peroxide; organic hydroperoxides, such as cumene hydroperoxide, t-butyl hydroperoxide; organic peroxides, such as benzoyl peroxide, acetyl peroxide, lauroyl peroxide, peracetic acid, and perbenzoic acid; and azo-type compounds such as azodiisobutyl nitrile, azobisdimethyl valeronitrile, azobisisobutyl nitrile, azodiisobutyl amide, azobis(alpha-ethylbutyl nitrile) and azobis(alpha, gamma-dimethylcarponitrile).

A chain transfer agent may also be added to control the molecular weight of the polymer. The chain transfer agent may be present in amounts ranging from 0% to about 5% based on the total weight of the monomers, and is preferably from about 0.2% to about 1.2%. The amount of chain transfer agent in the polymerization is inversely proportional to molecular weight; thus, if more chain transfer agent is added, the molecular weight will be lower. The chain transfer agent may include any compound which is able to transfer free radicals. Suitable chain transfer agents include carbon tetrachloride, bromoform, bromotrichloro-methane, triphenyl methane, mercapto propionic acid, alkyl mercaptans and thioesters such as n-dodecyl mercaptan, t-dodecyl mercaptan, octyl mercaptan, tetradecyl mercaptan, hexadecyl mercaptan, butyl thioglycolate, isooctyl thioglycolate, and dodecyl thioglycolate.

Other ingredients may be used in the emulsion polymerization that are well known in the art including chelating agents, buffering agents, inorganic salts and pH adjusting agents as further described in detail below.

The emulsions thus prepared will generally have a solids content of from about 20 to about 60%, and preferably about 40%. Prior to neutralization, the emulsion may be diluted with water until it has a solids content ranging from about 10 to about 35%, preferably from 15 and 25%. Alternatively, the composition may be neutralized into solution and then diluted to the desired solids content or, perhaps, not diluted at all. Generally, the salt-sensitive copolymer(s) should comprise from about 25 to 100 weight %, preferably 50 to 99.9 weight % of the total solids in binder composition. Water should be the primary medium in the binder composition although organic solvents may be present in lesser amounts, i.e., less than about 20%.

The molecular weight of the copolymers is not particularly limited, though it does affect the salt-sensitive properties of the polymer. The desired molecular weight range will depend on the specific monomer components and the desired application of the binder. Typically, however, the molecular weight of the polymer should be about 40,000 g/mol to about 500,000 g/mol, and preferably about 60,000 g/mol to about 250,000 g/mol. In general, the copolymers made according to the present invention exhibit a decrease in solubility as the molecular weight goes up.

The emulsion polymer typically has a particle size of from 10 to 1000 nm, preferably about 50 to 300 nm. The morphology of the polymer may vary from spheres to core-shell structures, voids, half-moons, and the like. When monomers of drastically different solubility or hydrophobicity are polymerized in an emulsion process, a wide variety of morphologies may result.

Once the emulsion compositions are formed as described herein, they can then be converted into a solution by any of the known neutralization methods involving lowering of the pH of the emulsion composition to form a clear solution. The objective of this neutralization is to convert the tertiary amino functional groups into water soluble quaternary ammonium salts. Thus, for instance, the neutralization can be effected by any means by which amino groups can be quatemized, such as by protonation to form quaternary salts. Examples of such protonation include neutralization with any protic acids such as an inorganic acid or an organic acid. A buffer solution can also be used to lower the pH so as to solubilize the emulsion into solution. Examples of organic acids include without any limitation, acetic acid, formic acid, oxalic acid, citric acid, lactic acid, succinic acid, malic acid, methanesulfonic acid, and the like. Examples of inorganic acids include without any limitation, hydrochloric acid, nitric acid, sulfuric acid, phosphoric acid, and the like. Hydrochloric acid, phosphoric acid or a mixture of both is preferred. Typically, about 5 to about 40 mole % of the amino functional units in the emulsion are neutralized, i.e., quaternized.

The emulsions typically become water-solubilized when the solution reaches a pH of from 5.0 to 8.0, preferably from about 6.0 to 7.5, and even more preferably from about 6.0 to 7.0. Control of neutralization and final solution pH is an important part of the process. Polymers that are over-quaternized can experience problems with viscosity or may exhibit undesirable properties. Using a relatively mild pH value in the inventive compositions is of great advantage in disposable consumer applications. Such pHs are desirable because they are compatible with a user's skin and will not likely cause irritation upon contact. It is, however, possible to utilize salt-sensitive, solubilized polymers with pH values outside the desired range. To make a fibrous web more compatible with a user's skin in such circumstances, the polymer may be applied to a fibrous web and the web may be treated with acidic agents, buffers, or the like.

It should be understood that the degree of neutralization required for the binder solutions to exhibit the desired properties (e.g., solubility, viscosity, salt-sensitivity) will vary depending on the composition and properties of the polymer. Such factors will include things such as the amount of amino functionalized monomer in the polymer chain and the molecular weight of the polymer.

The viscosity of the binder solution will also depend on many factors, e.g., the monomer content of the polymer. However, regardless of the makeup of the solution, the viscosity can generally be controlled by regulating one or more of the following aspects: 1) the amount of solids content in the emulsion; 2) the molecular weight of the polymer; 3) the extent that the composition is diluted either before or after neutralization; and 4) the extent of neutralization, i.e., quatemarization. The viscosity of the composition should be controlled so that it may be applied to a fibrous web by normal means, and also so that the composition adequately impregnates the web, thereby at least partially binding the fibers together. Thus, the viscosity of the binder composition should be below about 2,000 cps at room temperature (23° C.). Preferably it should be below 1000 cps, 500 cps, 200 cps and even more preferably below 150 cps at room temperature.

Other adjuvants may also be incorporated into the binder solution as dictated by the nature of the desired composition as well known by those of ordinary skill in the art. Examples of additives traditionally used include plasticizers, surfactants, tackifiers, thickeners, fillers, humectants, fragrances, pigments, titanium dioxide or other opacifiers, colorants, antifoams, bactericides, bacteriostats, and encapsulated components which may be employed in conventional amounts.

The fibrous webs employed in the present invention are non-woven webs. The non-woven structures of the present invention comprise the polymeric binder in combination with fibers. The non-woven is formed by any process known in the art, such as, but not limited to, airlaid, wetlaid, drylaid, or carded fiber. The webs may be creped or double re-creped ("DRC") webs as are known in the art. The fiber web typically has a basis weight of from 20-200 grams per square meter (gsm). The fibers in the non-woven material may be oriented isotropically, or be aligned with respect to a processing direction. Thicker non-wovens may additionally have fiber oriented in the z-direction of the article, i.e., perpendicular to the fabric plane. In addition to a binder material, the fibers in the non-woven materials may be interlocked mechanically to provide strength and cohesion.

In the manufacture of nonwoven webs, the fibers are typically dispersed in a medium (air for air-laid and liquid for wet-laid) and deposited in sheet form on a support base. In air-laid processes the fibers and other optional materials are typically suspended in air within a forming system and deposited as a sheet-like structure onto a moving forming screen or a rotating cylinder, prior to application of the binder. Wet-laid processes include providing an aqueous slurry and drying the slurry to form the web.

Fibers from any source and of any suitable length may be used in the present invention. Fibers include those known in the art including cellulosic fibers from woody plants such as deciduous and coniferous trees; non-woody plants, such as cotton, flax, esparto grass, milkweed, straw, jute and bagasse; and synthetic fibers, such as those derived from polyester, polypropylene, poly-ethylene, polyamides, polyacrylics, and rayon. Other fiber materials used in the art, and mixtures of any fibers, can be used in the present invention. Preferred fibers are those typically used in non-wovens, especially wood pulp fibers having a length of less than 0.5 cm such as kraft fibers. For wet-laid webs, the fibers should generally be less than a maximum of 5 cm long and most preferably less than 2 cm long. For air-laid webs, the fibers should be less than 8 mm long, preferably less than 6 mm long. Such fibers provide good biodegradable breakdown and dispersion characteristics. Fibers are present in the web at from 50 to 98 percent by weight, depending on the end use of the disposable article. For many uses, fibers make up about 70 to 85 percent by weight of web.

Generally, the fiber web is formed or at least partially formed prior to application of binder. The binder solution is combined with the fibers by contacting the fibers with the composition by means known in the art such as, printing, spraying with or without air, saturation, creping, and foam-application. The polymer may be combined with the fibers in the wet-end of the papermaking process (e.g., by addition to the paper furnish) or, preferably, after the paper product is substantially formed (e.g., via dry end addition). After application, the fibrous web is typically subjected to a drying step to remove water and/or other liquid. Drying may be accomplished by subjecting the paper product to elevated temperatures, e.g., in the range of from about 85° C. to about 125° C. for a time sufficient to achieve the desired level of dryness, typically to constant weight.

The amount of binder composition that remains on the fibers is referred to as "add-on." The percent add-on can be calculated as follows:

$$\text{Add-on \%} = \frac{\text{Combined binder/fiber wt.} - \text{Fiber wt.}}{\text{Combined binder/fiber wt.}} \times 100\%$$

The fiber weight is the weight of the fibers before any binder composition is applied. The fiber/binder weight is the weight of the dried (dry to the touch) product. The fibrous webs will generally have an add-on value of from 2 to 50 percent by weight, preferably from 10 to 30 percent by weight.

The binder has temporary wet strength in the presence of salt. Depending on the application, it may be desirable to apply the salt to the fibrous web during production. In such cases, the salt may be applied to the article during manufacture by conventional means such as spraying, coating, dipping, etc. Generally, the water-solubilized binder composition and the salt should not be mixed together before they are added to the fibers. The reason for this is that the salt has a tendency to precipitate the polymer if the two are combined prior to addition to the fibers. Thus, the disposable article that is being treated with the polymer binder is preferably subjected to the drying step to remove water and/or any other liquid prior to the addition of salt. Upon drying, the salt component can be added to the fiber/binder substrate to develop the in-use strength. The salt is typically applied to the web in a solution containing at least about 0.5 wt. percent salt to ensure the web maintains its temporary wet strength. It is preferred to employ salts with monovalent cations such as NaCl, as opposed to salts having multivalent cations which tend to affect the dispersibility characteristics of the binder.

Pre-moistened products produced according to present invention, such as wet wipes, may contain a wetting composition. The wetting composition should desirably contain at least 0.5 percent by weight of an inorganic salt. The wetting composition may contain one or more additives, which include, but are not limited to, sodium chloride or sodium sulfate solution, preservatives, boric acid, bicarbonates, moisturizers, emollients, surfactants, humectants, alcohols, water, and fragrances. The wetting composition may be present at up to 500 percentage by weight based on the weight of the non-woven material, and preferably up to 350 percent. The wetting composition is generally added as a secondary treatment of the non-woven web. This wet solution treatment can occur just prior to packaging, or after the non-woven has been placed in the final container. Prepared in this manner, wet-use products will have a stable wet strength of measurable tensile value and integrity, yet disperse when placed in tap water, allowing the product to be flushed in sewer or septic systems without blockage. The fiber typically begins dispersing immediately in water. The rate of dispersion can be tailored for different applications by varying factors such as the composition of the polymer, the molecular weight, the degree of neutralization, the pH of the solution, or the type of fiber web.

The inventive binders are particularly suitable for applications involving pre-moistened articles because the articles may be stored in a solution containing about 0.5 wt. percent or more of salt, whereby the articles maintain a high wet strength until disposed. Pre-moistened articles include those such as wet wipes, household wipes, pre-moistened baby wipes, pre-moistened toilet tissue, and pre-moistened household wipes. The inventive binder solutions may also be suitable for other disposable applications which employ salt-sensitive binders such as diapers, incontinent garments, feminine care products, and the like.

The fibrous webs of the present invention should be non-dispersible in solutions containing more than 0.5% salt, yet readily dispersible in typical wastewater. The fibrous webs used in the disposable articles of the present invention have binders that typically provide a characteristic wet strength index of at least about 40 in a 10% aqueous solution of NaCl, and preferably at least about 80, and more preferably at least about 100. Some binder compositions may provide wet strength indexes of over 120 in 10 wt. percent NaCl solutions. In addition, the binders generally provide a characteristic wet strength index in deionized water of less than 25, and preferably less than 10, and even more preferably less than 5.

In another aspect of this invention, there is also provided a method of making a nonwoven web with a polymeric binder, said method comprising the steps of:
  i) preparing an emulsion composition by emulsion-polymerizing in an aqueous medium a copolymer resin containing from about 5 to about 50 wt. percent of amino group containing repeat units derived from amino functionalized monomers and from about 50 to about 95 wt. percent of comonomer repeat units derived from other ethylenically unsaturated monomers;
  ii) converting the emulsion composition to a binder solution by neutralizing the copolymer resin with acid at least until it is water soluble;
  iii) providing a fibrous web; and
  iv) applying the binder solution to the fibrous web,
wherein the binder provides a characteristic wet strength index of less than 10 in deionized water and a characteristic wet strength index elevation of at least 15 points in a 10% aqueous solution of NaCl.

The salt-sensitive binder compositions provided in the present invention comprise water and an emulsion polymerized, water-solubilized binder composition which includes a copolymer comprising from about 5 to about 50 wt. percent of repeat units derived from 2-(dimethylamino)ethyl methacrylate or 3-(dimethylamino)propyl methacrylamide or combinations thereof; from about 25 to about 60 wt. percent of repeat units derived from alkyl acrylates having from 2 to 4 carbon atoms in the alkyl moiety; from about 25 to about 47.5 wt. percent of repeat units derived from alkyl methacrylates having from 1 to 2 carbon atoms in the alkyl moiety; and optionally including from about 0 to about 25 wt. percent of repeat units derived from ethylene wherein the binder polymer is neutralized such that it is water-soluble.

As already noted above, various alkyl acrylates can be employed in the preparation of binder compositions. Examples of alkyl acrylates that are suitable for the salt-sensitive binder compositions of this invention include without any limitation, methyl acrylate, ethyl acrylate, n-butyl acrylate, iso-butyl acrylate, tert-butyl acrylate, 2-hydroxyethyl acrylate and 2-hydroxybutyl acrylate. n-Butyl acrylate is particularly preferred. More particularly, the binder polymer of this invention includes from about 25 to about 60 weight % of repeat units derived from n-butyl acrylate.

Examples of alkyl methacrylates that are suitable for the salt-sensitive binder compositions of this invention include without any limitation methyl methacrylate, ethyl methacrylate and butyl methacrylate. Methyl methacrylate is particularly preferred.

Vinyl acetate and optionally ethylene may be incorporated into the binder if so desired.

In another aspect of this invention there is also provided a salt-sensitive, aqueous binder solution for a nonwoven web comprising:
  a) water; and
  b) a water-solubilized resin composition converted from an emulsion copolymer, where the resin composition includes:
    (i) a copolymer resin containing from about 5 to about 50 wt. percent of amino group containing repeat units derived from amino functionalized monomers and from about 50 to about 95 wt. percent of comonomer repeat units derived from other ethylenically unsaturated monomers; and
    (ii) an amount of emulsifier effective to maintain a stable emulsion during polymerization of the polymer,
wherein the binder provides a characteristic wet strength index of less than 10 in deionized water and a characteristic wet strength index elevation of at least 15 points in a 10% aqueous solution of NaCl.

In this aspect of the invention, the emulsifier in the binder solution is present in an amount of from about 0.05 to about 10 wt. percent, based on the total solids weight. Preferably, the emulsifier is present in an amount of from about 0.2 to about 5 wt. percent, based on the total solids weight. Various emulsifiers as described above may be employed. Preferably, the emulsifier includes one or more polymerizable surfactants that are polymerized into the backbone of the copolymer as described above.

In a specific embodiment of this invention, there is provided a disposable article with a nonwoven web which includes a salt-sensitive polymeric binder featuring certain improvements. Specifically, the improvement is featured in the binder, which comprises:
  a) an emulsion polymerized, water-solubilized resin composition having: (i) a copolymer resin containing from about 5 to about 50 wt. percent of amino group containing repeat units derived from amino functionalized monomers and from about 50 to about 95 wt. percent of comonomer repeat units derived from other ethylenically unsaturated monomers; and (ii) an amount of emulsifier effective to maintain a stable aqueous emulsion with the copolymer as it polymerizes,
wherein the binder provides a characteristic wet strength index of less than 10 in deionized water and a characteristic wet strength index elevation of at least 15 points in a 10% aqueous solution of NaCl.

In this embodiment, the resin composition contains about 40 wt. percent of repeat units derived from n-butyl acrylate, about 40 wt. percent of repeat units derived from methyl methacrylate and about 20 wt percent repeat units derived from 2-(dimethylamino)ethyl methacrylate or 3-(dimethylamino)propyl methacrylamide. Additionally, the emulsifier consists of one or more polymerizable surfactants that are polymerized into the backbone of the copolymer.

Further details as to synthesis and use of salt-sensitive binders is found in the following patents and copending applications, the disclosures of which are incorporated by reference: U.S. Pat. No. 7,320,831, issued Jan. 22, 2008, entitled "Salt-Sensitive Vinyl Acetate Binder Compositions and Fibrous Articles Incorporating Same"; U.S. Pat. No. 7,173,085, issued Jan. 22, 2008, entitled "Salt Sensitive Aqueous Emulsions"; U.S. patent application Ser. No. 11/985,261, filed Nov. 14, 2007, entitled "Salt-Sensitive Binder Composition with Latex Processing Aid"; U.S. patent application Ser. No. 11/985,207, filed Nov. 14, 2007, entitled "Salt-Sensitive Binders Containing Vinyl Acetate for Nonwoven Webs and Method of Making Same"; U.S. patent application Ser.

No. 11/339,216 (U.S. Patent Application Publication No. US 2007-0173594 A1), filed Jan. 25, 2006, entitled "Salt-Sensitive Binders for Nonwoven Webs and Method of Making Same"; U.S. patent application Ser. No. 11/120,381 (U.S. Patent Application Publication No. US 2006-0252877 A1), filed May 3, 2005, entitled "Salt-Sensitive Binder Compositions with N-Alkyl Acrylamine and Fibrous Articles Incorporating Same"; and U.S. patent application Ser. No. 09/883,520 (U.S. Patent Application Publication No. US 2003-0008591 A1), filed Jun. 18, 2001, entitled "Water Dispersible, Salt Sensitive Non-Woven Materials.

The following examples are presented to further illustrate and explain the present invention and should not be taken as limiting in any respect.

EXAMPLES

The binder solutions of this invention may be prepared by emulsion polymerization using varied amounts of monomers as described herein in desirable monomer ratios. The following examples serve illustrative examples for the preparation of emulsion copolymers in accordance with this invention.

Example 1

A quantity of 560 grams of deionized water is added to a 4 L glass reactor equipped with a condenser, thermometer and stainless steal agitator. Next, a solution of 121 grams of water and 27 grams of Disponil 3065, and 15 grams of Ammonyx Cetyl, a cationic surfactant, are mixed. The following components are then added to the water/surfactant mixture: 100 grams of N,N-dimethylamino ethyl methacrylate (DMAEMA), 200 grams of n-butyl acrylate, 200 grams of methyl methacrylate, and 2.5 grams of dodecyl mercaptan. The mixture is agitated to give a stable monomer pre-emulsion. To the reactor charge is added, 33 grams of monomer pre-emulsion. Then, 0.3 grams of ammonium persulfate in 5 grams of water is added to the reactor charge. The reaction mixture is heated to 80° C. After 10 minutes, the remaining monomer pre-emulsion is added over a 4 hour period to the reactor. Also, 2.4 grams of ammonium persulfate in 45 grams of water is added to the reactor for about 4.5 hours. After completion of monomer and initiator slow-adds, the reaction mixture is cooled to 60° C. The metering of reducing component, which is composed of 10 grams of water and 0.7 grams of Erythorbic acid, is started at an internal reactor temperature of 60° C. The reaction mixture is maintained between 55-60° C. for 10 minutes. After completing the metering of reducing component, the reaction mixture is cooled to 30° C.

Example 2

A methyl methacrylate/butyl acrylate/styrene/dimethylaminomethyl methacrylate binder is prepared using the ingredients, recipe and procedure indicated below.

| | |
|---|---|
| Methyl methacrylate (MMA) | 25.00 |
| Butyl acrylate (BA) | 43.00 |
| Styrene | 10.00 |
| 2-N,N-(dimethyl amino)ethyl methacrylate (DMAEMA) | 22.00 |
| Deionized Water | 133.05 |
| Disponill AES 72 IS | 2.00 |
| Sinnopal NP 307 | 1.00 |
| Ammonium persulfate | 0.82 |
| Sodium carbonate | 0.14 |

Quantities expressed in parts of active product for 100 parts of total monomers.

Raw Materials

| Monomers | |
|---|---|
| Disponil AES 72 IS (N.P.E. sodium sulphate with 25 EO) | Arkema |
| Sinnopal NP 307 (Nonyl Phenol Ethoxylate with 30 EO) | Cognis |
| | Cognis |

Latex Characteristics

| | |
|---|---|
| Coagulum | 150 ppm |
| Solid content | 42% |
| pH | 8.7 |
| Particles size | 107 nm |
| Brookfield Viscosity (#1, 20 rpm) | 400 mPa · s |
| MFFT | 4° C. |
| Chemical Stability (CaCl2 10%) | Good |
| Mechanical Stability (12000 rpm) | Good |

Recipe

| | parts (active) | weight (g) (ingredient) |
|---|---|---|
| A) Kettle charge | | |
| Deionized water | 95.00 | 393.06 |
| Disponil AES 72 IS | 1.00 | 12.06 |
| Sodium carbonate | 0.14 | 0.57 |
| B) Preemulsion 1 | | |
| Deionized water | 17.00 | 66.92 |
| Disponil AES 72 IS | 0.50 | 6.03 |
| Sinnopal NP 307 | 0.50 | 3.01 |
| MMA | 16.00 | 67.52 |
| BA | 24.00 | 61.28 |
| Styrene | 8.00 | 33.76 |
| C) Preemulsion 2 | | |
| Deionized water | 18.00 | 71.14 |
| Disponil AES 72 IS | 0.50 | 6.03 |
| Sinnopal NP 307 | 0.50 | 3.01 |
| MMA | 9.00 | 37.98 |
| BA | 19.00 | 80.18 |
| Styrene | 2.00 | 8.44 |
| DMAEMA | 22.00 | 84.40 |

Disponil AES 72 IS: 35% Active Product in Water

Sinnopal NP 307: 70% Active Product in Water

|  | parts (active) | weight (g) (ingredient) |
|---|---|---|
| D) Initiator 1 solution |  |  |
| Deionized water | 1.80 | 7.60 |
| Ammonium persulfate | 0.41 | 1.73 |
| E) Initiator 2 solution |  |  |
| Deionized water | 1.25 | 5.28 |
| Ammonium persulfate | 0.41 | 1.73 |
| Total | 237.70 | 1000 |

Quantities expressed in parts of active substance for 100 parts of total monomers, and in grams of commercial products for 1 kg of latex.

Procedure

1. Introduce kettle charge A), and heat to 85° C. under stir while purging system with N2. Maintain N2 blanket throughout run.
2. Introduce 2% of the preemulsion 1 B) in 4 minutes. Maintain at 85° C. for 2 minutes.
3. Introduce initiator 1 solution D) in 10 minutes. Maintain at 85° C. for 14 minutes.
4. Then introduce the remaining 98% of preemulsion 1 B) over a 90 minutes period while maintaining temperature at 85° C.
5. After addition, hold at 85° C. for 1 hour.
6. Neutralize the emulsion with ammonia 20% to obtain pH≧7.
7. Then introduce the preemulsion 2 C) and initiator 2 solution E) separately over a 90 minutes period while maintaining temperature at 85° C.
8. After addition, hold at 85° C. for 2 hours.
9. Cool below 30° C., filter through 100 mesh screen.

Examples 3-13

The following compositional abbreviations are used in the examples summarized below in Table 3:

| BA | n-Butyl Acrylate monomer |
| MMA | Methyl Methacrylate monomer |

-continued

| DMAPMA | 3-(N,N-dimethylamino)propyl methacrylamide monomer |
| DMAEMA | 2-(N,N-dimethylamino)ethyl methacrylate monomer |

Following the procedures noted above and also generally in United States Patent Application Publication No. US 2005/0075445 of Confalone et al., the disclosure of which is incorporated herein by reference, a series of binders having the composition set forth in Table 3 may be prepared, neutralized and utilized as a binder in a nonwoven structure.

TABLE 3

Composition of Examples 3-13, Parts per Hundred Weight Monomer

| Example | BA | MMA | DMAPMA | DMAEMA |
|---|---|---|---|---|
| 3 | 40 | 40 | — | 20 |
| 4 | 50 | 35 | 15 | — |
| 5 | 60 | 25 | 15 | — |
| 6 | 42.5 | 42.5 | 15 | — |
| 7 | 40 | 40 | 20 | — |
| 8 | 42.5 | 42.5 | — | 15 |
| 9 | 30 | 30 | — | 40 |
| 10 | 25 | 25 | — | 50 |
| 11 | 50 | 30 | 20 | — |
| 12 | 45 | 35 | — | 20 |
| 13 | 35 | 35 | 30 | — |

Examples 14-17

Following generally the examples noted above, another series of polymers were prepared. Details appear in Table 4 including projected salt insolubility.

TABLE 4

BA/MMA/Amine Functional Binders

| Example # | % Amino Monomer | Type of Amino Monomer | BA/MMA | Fixed Neutralization | % Insoluble In 5% Salt Solution, Projected | % Insoluble DI Water |
|---|---|---|---|---|---|---|
| 14 | 20 | DMAEMA | 1 | 80 | 90.8 | 0 |
| 15 | 20 | DMAEMA | 1 | 60 | 90.7 | 0 |
| 16 | 15 | DMAPMA | 1.42 | 85 | 92.6 | 0 |
| 17 | 15 | DMAPMA | 2.40 | 85 | 93.0 | 0 |

After polymerization, the examples may be diluted to the desired solids content which should generally be at about 20%. The binder solution is then prepared at room temperature by neutralizing the polymer according to the following procedure: the emulsion composition is agitated and 2N hydrochloric acid is added until the desired degree of neutralization is achieved, i.e., the opaque emulsion compositions are neutralized at least to the point where they are as translucent as possible.

The binder solution can then be applied to pulp substrates and tested for tensile strength after wetting in aqueous solutions having varying ion concentrations. The wet tensile strengths and wet strength index values for each sample can then be calculated using the following procedures.

The procedure for preparing the saturated pulp substrate is as follows: a pulp substrate is dip-nip saturated with binder solution and then thermally dried and post-treated to simulate temperature conditions in commercial pulp manufacturing. Whatman #4 Qualitative Filter Paper sheets, commercially available from Whatman, Inc., are the pulp base stock and are stored under controlled temperature (23° C.) and humidity (50%) conditions before use. The pulp is cut to approximately 11.5×57 cm strips and weighed to 0.01 gm.

The Whatman pulp is dip-nip saturated by passing the pulp through a binder bath and then passing the saturated sheets through the pressurized nip rolls of a dual roller saturator (Werner Mathis VFM or a similar saturator) to squeeze off the excess polymer solution. The saturated sheet is then placed into a heated drum drier (Adirondack or a similar drier) set at 100° C. until dry to the touch (usually about 2-3 passes). After initial drying, the pulp is placed into an oven set at 130° C. for two minutes. The saturated dried sheet is re-conditioned at controlled temperature and humidity conditions for a minimum of one hour. The sheet is reweighed to 0.01 gm and then calculated for percent add-on.

The procedure for preparation of tensile strips and soak solutions is as follows: The saturated pulp is cut into 1×4 inch cross-machine tensile strips using a precision paper cutter (Test Machines, Inc. or similar cutter). The tensile strips are weighed and the weight is used to calculate basis weight in grams/square meter. Test solutions are prepared as follows:
  a) Solutions of 10% sodium chloride (NaCl) by weight in deionized water.
  b) A 200 ppm hard water solution using 134 ppm $Ca^{++}$ from calcium chloride ($CaCl_2$) and 66 ppm $Mg^{++}$ from magnesium chloride ($MgCl_2$) in deionized water.
  c) Standard deionized water.

Tensile testing and normalization is performed as follows: The test strips are soaked in the various solutions and then measured for wet strength. The solutions represent the type of environments which the pulp may be exposed to, e.g., concentrated salt conditions for in-use storage (10%) and various water conditions for disposal (200 ppm for hard water disposal and deionized for softer water disposal).

The raw tensile strength is normalized to a standard basis weight in order to marginalize the effects of variations in the fabric weight. First, a tensile tester (Instron 5542 or a similar tester) is set to the following parameters: a) pneumatic grips using 1×1 inch facings; b) a gap of 2 inches between the top and the bottom facings; c) a crosshead speed of 1 inch/minute; and d) a load cell capable of measuring up to 20,000 gm/inch. Tensile strips are soaked (4-6 strips per soak solution) for 60 minutes in the specified soak solution with an emphasis placed on ensuring that full wetting of the strips occurs. The level of soak solution used is as follows: a) 125 gm 10% NaCl salt solution per tensile group (4-6 strips); and b) 45 gm of hard water and deionized water per tensile strip soaked. Upon removal from the soak solution, the tensile strip is placed onto absorbent paper toweling to remove excess solution and then immediately tested for tensile strength. The average tensile strength (gf/inch) is then normalized and reported to a basis weight of 112.5 gsm using the following formula:

$$\text{Normalized Tensile Strength} = \frac{\text{Average Tensile Strength(gf/in)} \times 112.5 \text{ gsm}}{\text{Actual Basis Wt. (gsm)}}$$

All tests results are reported at a normalized tensile strength of 112.5 gsm.

The wet strength index is then calculated for each example in order to minimize the differences in wet strength due to varying levels of binder add-on. It is calculated according to the following formula:

$$\text{Wet Strength Index} = \left(\frac{\text{Normalized Wet Tensile Strength}}{\text{Percent Add-on}}\right)$$

The wet strength index of each example is calculated in deionized water and in a 10% NaCl solution.

The above examples are intended to more fully explain the invention as defined by the claims, below. Many modifications and variations of this invention can be made without departing from its spirit and scope, as will be apparent to those skilled in the art. For example, increasing or decreasing the various monomer ratios can influence the tensile performance of a web, as can changing the level of neutralization. Other factors can also affect the dispersibility of a web such as the type of fibers, the structure of the substrate, and the amount of binder used. Of course, it will also be understood that the specific wet strength properties should vary depending on the desired application. The specific embodiments described herein are offered by way of example only, and the invention is to be limited only by the terms of the appended claims, along with the full scope of equivalents to which such claims are entitled.

In view of the foregoing discussion, relevant knowledge in the art and references discussed above in connection with the Background and Detailed Description, the disclosures of which are all incorporated herein by reference, further description is deemed unnecessary.

What is claimed is:

1. A method of making a nonwoven web with a polymeric binder, said method comprising the steps of:
  i) preparing an emulsion composition by emulsion-polymerizing in an aqueous medium a copolymer resin containing from about 5 to about 50 wt. percent of amino group containing repeat units derived from amino functionalized monomers and from about 50 to about 95 wt. percent of comonomer repeat units derived from other ethylenically unsaturated monomers;
  ii) converting the emulsion composition to a binder solution by neutralizing the copolymer resin with acid at least until it is water soluble;
  iii) providing a fibrous web; and
  iv) applying the binder solution to the nonwoven web, such that the binder solution impregnates the web, thereby at least partially binding the fibers together,
wherein the binder provides a characteristic wet strength index of less than 10 in deionized water and a characteristic wet strength index elevation of at least 15 points in a 10% aqueous solution of NaCl.

2. The method for producing a nonwoven web with a polymeric binder according to claim 1, further comprising controlling the viscosity of the binder solution to be less than about 2,000 cps at 23° C.

3. The method according to claim 2, further comprising the step of diluting the emulsion composition to a solids level of from about 10 to about 35 wt. percent prior to neutralizing the copolymer resin.

4. The method according to claim 2, wherein the viscosity of the binder solution is controlled to be less than about 1,000 cps at 23° C.

5. The method according to claim 2, wherein the copolymer resin comprises amino group containing repeat units derived from the monomers selected from the group consisting of: 2-(N,N-dimethylamino)ethyl methacrylate; 2-(N,N-diethylamino)ethyl methacrylate; 2-(N,N-dimethylamino) ethyl acrylate; 3-(N,N-dimethylamino)-2,2-dimethylpropyl acrylate; 2-(N,N-diethylamino)ethyl acrylate; 2-(tertiary-butylamino)ethyl methacrylate; 3-(N,N-dimethylamino)propyl methacrylamide; vinylpyridine and allylamine, or a mixture in any combination thereof.

6. The method according to claim 2, wherein the copolymer resin comprises amino group containing repeat units derived from 2-(dimethylamino)ethyl methacrylate or 3-(dimethylamino)propyl methacrylamide or a mixture thereof 7. The method according to claim 2, wherein the copolymer resin comprises comonomer repeat units derived from other ethylenically unsaturated monomers selected from the group consisting of: methyl acrylate, ethyl acrylate, butyl acrylate, methyl methacrylate, ethyl methacrylate, butyl methacrylate, 2-hydroxyethyl acrylate, 2-hydroxybutyl acrylate, tertiary butyl acrylamide, N-tertiary octyl acrylamide, isopropyl acrylamide, and N-(1,1,-dimethyl-3-oxobutyl) acrylamide.

8. The method according to claim 2, wherein the copolymer resin comprises comonomer repeat units derived from n-butyl acrylate, methyl methacrylate or both.

9. The method according to claim 2, wherein the copolymer resin comprises comonomer repeat units derived from vinyl acetate and optionally ethylene.

10. The method according to claim 2, wherein the emulsion composition is neutralized by an inorganic acid.

11. The method according to claim 2, wherein the viscosity of the binder solution is controlled to be less than 500 cps at 23° C.

12. The method according to claim 2, wherein the viscosity of the binder solution is controlled to be less than 200 cps at 23° C.

13. The method according to claim 1, wherein the copolymer resin comprises amino group containing repeat units derived from 2-(dimethylamino)ethyl methacrylate or 3-(dimethylamino)propyl methacrylamide or a mixture of both.

14. The method according to claim 1, wherein the copolymer resin comprises comonomer repeat units derived from n-butyl acrylate, methyl methacrylate or both.

15. The method according to claim 1, wherein the copolymer resin comprises comonomer repeat units derived from vinyl acetate and optionally ethylene.

16. The method according to claim 1, wherein the emulsion composition is neutralized by hydrochloric acid, phosphoric acid or a mixture of both.

17. The method according to claim 1, wherein the binder solution comprises:
a) water; and
b) a water-solubilized resin composition converted from an emulsion copolymer, where the resin composition includes: (i) a copolymer resin containing from about 5 to about 50 wt. percent of amino group containing repeat units derived from amino functionalized monomers and from about 50 to about 95 wt. percent of comonomer repeat units derived from other ethylenically unsaturated monomers including vinyl acetate and optionally ethylene; and (ii) an amount of emulsifier effective to maintain a stable emulsion during polymerization of the polymer.

18. The method according to claim 17, wherein the emulsifier is present in an amount of from about 0.05 to about 10 wt. percent, based on the total solids weight.

19. The method according to claim 17, wherein the emulsifier is present in an amount of from about 0.2 to about 5 wt. percent, based on the total solids weight.

20. The method according to claim 17, wherein the emulsifier includes one or more polymerizable surfactants that are polymerized into the backbone of the copolymer.

21. The method according to claim 1, wherein the binder solution is neutralized to a pH of from 6.0 to 7.5.

22. The method according to claim 21, wherein the binder solution is neutralized to a pH of from 6.0 to 7.0.

23. The method according to claim 1, wherein the copolymer resin contains less than 0.25 wt. percent of pre-crosslinkable monomers and less than 0.25 wt. percent of post-crosslinkable monomers.

24. The method according to claim 1, wherein the copolymer resin contains less than 0.1 wt. percent crosslinking monomer.

25. The method according to claim 1, wherein the copolymer resin includes from about 25 to 60 wt. percent of repeat units derived from alkyl acrylates having from 2 to 4 carbons in the alkyl moiety and from 25 to 47.5 wt. percent of repeat units derived from alkyl acrylates having from 1 to 2 carbons in the alkyl moiety.

26. The method according to claim 1, wherein the copolymer resin includes n-butyl acrylate and methyl methacrylate.

* * * * *